Feb. 23, 1965 C. W. HAASE 3,171,041
SINGLE INPUT GATE CONTROLLING CIRCUIT
Filed July 20, 1961
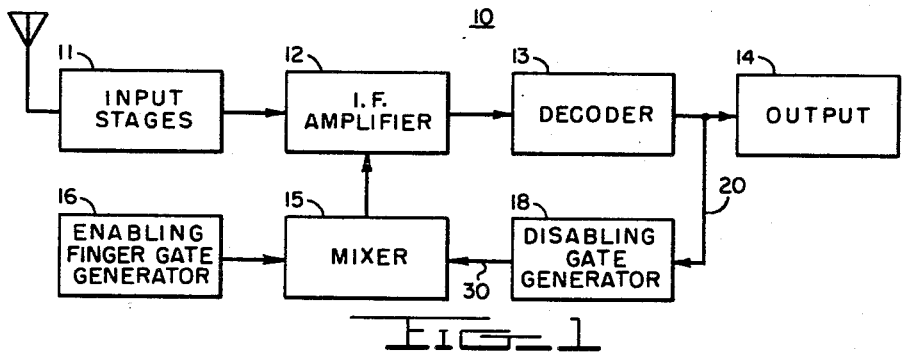
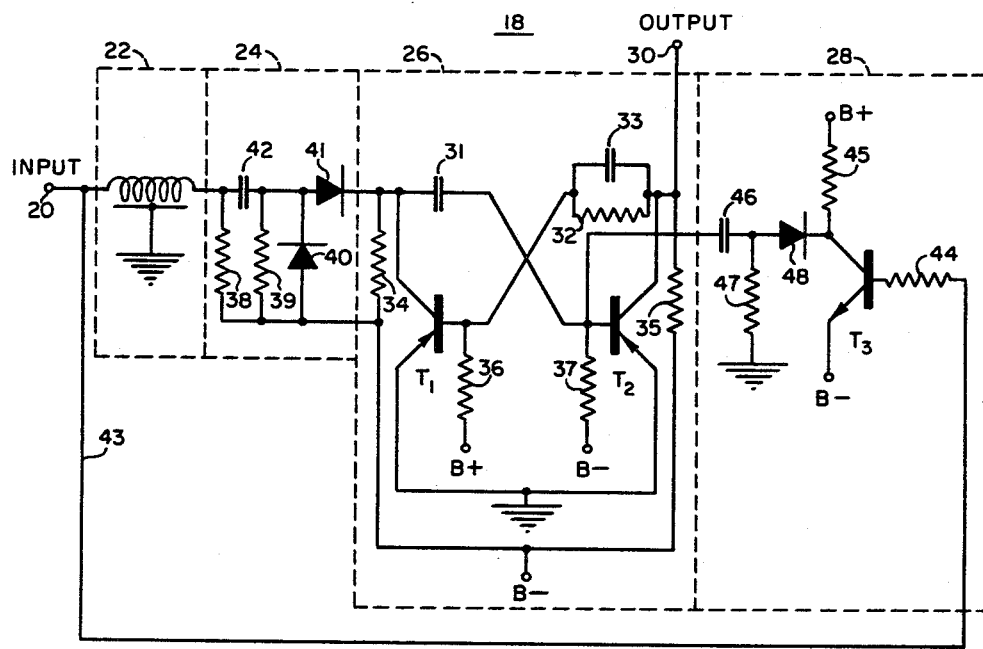
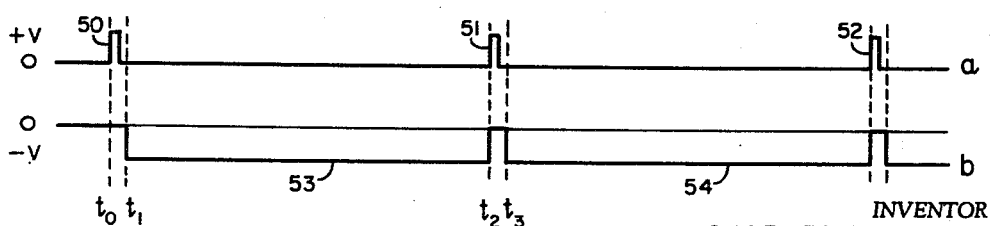
INVENTOR
CHARLES W. HAASE
BY Richard Reed
John E. Kidd
ATTORNEYS

3,171,041
SINGLE INPUT GATE CONTROLLING CIRCUIT
Charles W. Haase, Glassmanor, Md., assignor to the United States of America as represented by the Secretary of the Navy
Filed July 20, 1961, Ser. No. 125,596
9 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention relates to an electronic receiving system employing a multivibrator circuit and more particularly to a system for generating a disabling gate which will deactivate the system for a predetermined period of time.

In the field of communications, it becomes extremely valuable to be able to transmit a signal and have a receiver some distance away that is capable of receiving that specific signal and performing a task. Such a system is limited, however, by the presence of false signals or other interfering signals which may also cause the receiver to be activated at times other than when the specific signal desired is received from the transmitter. In past systems, when one receiver and one transmitter are used, the problem is not critical, but when more than one transmitter is used the problem of interference by false or spurious signals becomes serious. The problem becomes extreme when many transmitters are sending signals to various receivers and especially when they are in close proximity. Thus there exists a prime need for an interference free system.

Currently there are devices known for limiting interference but none appear available for providing an interference free circuit such as required by a system of multiple transmitter and receiving units. The best way of preventing interfering or unwanted signals from activating the receiving units would appear to be by keeping the units in an inactive state when the proper signal is not expected.

Accordingly it is an object of this invention to provide a circuit capable of disabling a receiving unit for a specific period of time.

It is also an object of this invention to provide a receiving system that will operate and perform and still remain unsusceptible to interference by false and spurious signals.

It is a further object of this invention to provide a multivibrator circuit that is capable of initiating an output pulse every time an input pulse is impressed upon the circuit and which will provide an effectively continuous gate so long as the repetitive periods of the input signal is less than the period of the multivibrator.

Yet a further object of this invention is to provide a receiving system wherein a disabling circuit provides a wide gate for biasing the system into nonoperation, indefinitely except for short periods when finger gates are present, so long as the proper input pulses are being received and yet is capable of turning the gate off automatically soon after the proper input pulses cease.

Still another object of this invention is to provide a disabling pulse generating circuit that is simple and compact and which will operate within a receiving system yet still provide a highly stable means of preventing spurious and other unwanted signals from interfering in the receiving system.

Other objects and advantages of this invention will become more apparent to those skilled in the art from the following description of the annexed drawings, which illustrate a preferred embodiment and wherein:

FIG. 1 shows in block diagram a receiving system wherein this invention is used.

FIG. 2 shows a schematic diagram of a disabling gate circuit in accordance with the principles of my invention.

FIG. 3a and b depicts the input and output pulses, respectively associated with the circuit shown in FIG. 2.

In order to provide a communications system where the receiver will not be hindered in its operation by interference from undesired sources of pulse signals, it is required that the receiver be initially in a receiving condition. After the system has received, what appears to be the proper pulse code, the receiver must then be disabled until one repetitive period of the code signal from the transmitter has elapsed. During the period within which the receiver is disabled, finger gates are then employed to turn the receiver on for short periods of time. If pulses are received during each finger gate period, the receiver assumes it has received the signal from the proper transmitter and becomes disabled again for another repetitive period. If pulses are not received, when the finger gates are applied to the system, the receiver assumes it was triggered by an erroneous signal and it opens up again so as to search for its proper pulse signal. By turning the receiver off for the proper repetitive period and then allowing it to open up only to allow the proper code to come through by means of finger gates, a receiving system is provided for adequately determining whether the initial decode pulse is from the proper transmitter. To disable the receiver, a very wide disabling gate is needed for reverse biasing the I.F. stages of the system. Therefore the enabling finger gate generator must produce finger gates to allow repetitive pulse signals to be received, while the disabling gate generator must be able to produce disabling gates as long as the proper repetitive pulse signals are being received and yet capable of turning itself off when proper pulse signals are not received.

To implement the above desired operation, a system as generally shown in FIG. 1 is required. Here, the receiver 10 initially sees what appears to be the proper pulse code by means of input stages 11, and the I.F. amplifier 12 and applies a pulse to the decoder 13. In turn, decoder 13 actuate the disabling gate generator 18 which provides a wide disabling gate for the I.F. amplifier, effectively biasing it, so as to prevent the I.F. amplifier from operating. The gate should be longer than the longest repetitive input signal period that is expected to be received. A period of 5000 microseconds for the disabling gate have proved to be effective. Finger gates from generator 16 are then periodically superimposed on the disabling gate by mixer circuit 15, at the exact pulse space interval that the receiver 10 is set for. If the initial decode pulse was a proper one, it will be duplicated through the finger gates and a second pulse will be applied by decoder 13 to the input 20 of the disabling gate circuit 18, allowing the circuit to provide another disabling gate to I.F. amplifier 12. If the proper pulses do not all appear simultaneously with the finger gates, it is rightly assumed that the first decode pulse was not the true one and no second pulse will be impressed on input 20 by decoder 13. Since no second pulse is received by disabling gate circuit 18, the disabling gate being applied to the I.F. amplifier will disappear a few hundred microseconds after the second input pulse was supposed to have appeared and allow the input stages and the I.F. amplifier to begin searching again for a properly spaced pulse train.

Considering now the problem of deactivating the receiver 10, FIG. 2 shows a solid state generator circuit for providing the required disabling gate. Here, there is shown a flip-flop circuit that will act like a monostable and a bistable translating device at the same time. The multivibrator of this invention includes a pair of discharge devices, such as PNP type transistors $T_1$ and $T_2$, each having their respective base, collector and emitter electrodes. The collector of transistor $T_1$ is cross coupled to the base of transistor $T_2$ by means of cross coupling capacitor 31. At the same time, resistor 32 and shunt-connected capacitor 33 cross couple the collector of transistor $T_2$ to the base of transistor $T_1$. Both collectors are negatively biased through load impedances 34 and 35 while both emitters are connected to ground. The base of transistor $T_1$ is positively biased by through resistor 36 so as to be non-conducting when multivibrator 18 is in its steady state whereas the base of transistor $T_2$ is negatively biased through resistor 37 providing saturating base drive so as to be "on" or conducting when the circuit is in the steady state. The single input terminal 20 receives the code pulse signal from decoder 13. The signal is coupled to the collector of transistor $T_1$ by means of delay circuit 22, which in this invention comprises a delay line, and a standardizing circuit 24 which includes resistors 38 and 39, semi-conductors 40 and 41 and condenser 42. The same input signal is also applied to the base of transistor $T_2$ by means of a pulse generating circuit 28. The input pulse at 20 is applied to the base of NPN type transistor $T_3$ through current limiting resistor 44. Transistor $T_3$ is biased through load impedance 45 by a negative potential applied to its emitter electrode. Coupling transistor $T_3$ to the base of transistor $T_2$ is a differentiating circuit comprising capacitor 46, resistors 37 and 47 and diode 48. The collector of transistor $T_2$ is tapped as the connection for output terminal 30.

In FIG. 3a, pulses from decoder 13 applied to input terminal 20 are shown at 50, 51 and 52. The time interval from $t_0$ to $t_1$ represents the period from the time the input pulse is applied at terminal 20, traverses delay circuit 22 and is applied to the collector electrode of transistor $T_1$. It should also be noted that the period of the input pulses appearing at terminal 20 is less than the natural period of the multivibrator 26. FIG. 3b shows the wide negative gates generated at output terminal 30 when transistor $T_1$ is turned on. These are the gates that reverse bias the I.F. amplifier of FIG. 1.

Considering now the operation of the single input disabling gate circuit 18, initially the multivibrator 26 is so designed that transistor $T_1$ is initially at cut off and transistor $T_2$ due to the base being at a negative potential with respect to the ground potential of the emitter is in saturation. When the first input pulse 50 appears at terminal 20, it is fed by lead 43 immediately over the base electrode of transistor $T_3$ causing the transistor to fire. Transistor $T_3$ in turn provides a negative pulse to the base electrode of transistor $T_2$. Since transistor $T_2$ is all ready conducting, the negative pulse has no effect on the steady state of multivibrator 26. At the same time the input pulse is delayed by circuit 22 for a short interval (2 to 5 microseconds) represented by the period between time $t_0$ and $t_1$, after which the base of transistor $T_2$ is biased positively, driving transistor $T_2$ to cut off and triggering transistor $T_1$ to saturation, thereby causing a negative pulse 53 to be developed at output terminal 30. A natural period for the unstable state of multivibrator 26 of over 5000 microseconds are possible and for producing an effectively continuous gate such as shown in FIG. 3b (the period between $t_2$ and $t_3$ is only several microseconds) the only requirement is that the repetitive period of the input pulses must be less than the natural period of the multivibrator.

If the proper code is being received, the decoder 13 will cause a second input pulse 51 to be impressed on terminal 20. This second input pulse is also fed immediately over to transistor $T_3$ causing another negative pulse to be developed, sharpened by the differentiating circuit and applied to the base of transistor $T_2$. However, this time the pulse has the effect of forcing, transistor $T_2$ back into saturation and the multivibrator back into the steady state. It should be observed here, that the multivibrator is being prematurely forced into its steady state before its natural period has elapsed. After resuming its steady state it is again ready to be actuated to produce a negative voltage 54. All of this occurs in less time ($t_2$ to $t_3$) than it takes the second pulse to reach the base of transistor $T_2$ by way of delay means 22.

The second pulse, as the first pulse, is delayed by circuit 22 sufficiently long enough so as to switch the multivibrator back to its steady state by driving transistor $T_2$ into saturation and biasing $T_1$ to cut off. Upon reaching the base of transistor $T_2$ it finds the multivibrator completely recovered whereupon it biases transistor $T_2$ into cut off which again drives transistor $T_1$ into conduction. When transistor $T_1$ conducts, the negative gate 54 is developed at output terminal 30 and again disables the I.F. amplifier 12. The process will continue for each succeeding input pulse. Since the time interval between $t_0$ and $t_1$ and $t_2$ and $t_3$ is so small compared to the time period between $t_1$ and $t_2$ a virtually continuous output gate for disabling the I.F. stages is possible.

If the input pulses from decoder 13 stop, as for example if pulse 51 was not available, then the multivibrator 26 would stop at the end of its natural period which in this example would be sometime before pulse 52 arrives at terminal 20. In this situation when multivibrator 26 reaches the end of its natural period, transistor $T_1$ goes to cut off and transistor $T_2$ is driven back into saturation returning the multivibrator to its steady state.

Limiting circuit 24 is employed so as to standardize the pulse signal fed to the base of transistor $T_2$ thereby providing a more stable and efficient single input gate control circuit. The circuit tends to reduce jitter by not allowing the multivibrator to trigger earlier on better shaped input pulses. The resistors 38 and 39 and capacitor 42 tend to attenuate and differentiate the input pulse while diodes 40 and 41 only allow positive pulses of a particular polarity through, thereby protecting the circuit from false triggering or pulses that may damage the circuit.

Hence, it is possible for this invention to provide a virtually continuous negative disabling pulse for deactivating receiver 10 and doing this only when the proper pulse is supposedly being received. If the proper pulse is not being received, the circuit automatically turns the disabling gate off and begins searching for its true code again.

Various modifications are contemplated and may obviously be resorted to by those skilled in the art without departing from the spirit and scope of the invention as set forth in the appended claims.

What is claimed is:

1. A single input gate controlling circuit comprising first and second discharge devices connected as a monostable multivibrator, output means connected to said second discharge device, input signal means for providing a signal for said discharge devices, means coupled between said input means and said first discharge device for delaying said signal for a predetermined time period, and circuit means coupled between said input means and said second discharge device for prematurely triggering said second discharge device, whereby the device may be operated as a bistable multivibrator and a monostable multivibrator.

2. In a circuit for generating a deactivating pulse, a monostable multivibrator comprising a first and second wave translating device, each having an input circuit and an output circuit, circuit means for cross coupling the respective input and output circuits, means for providing a periodic input signal of predetermined frequency, utilization means connected to the output circuit of said second wave translating device, circuit means coupled between said input signal means and said first translating device for delaying an input signal, and means prematurely triggering said second translating means coupled between said second translating means and said input signal means, whereby the said multivibrator can also be operated as a bistable multivibrator.

3. In a receiver, the combination of circuit means for converting and decoding a transmitted wave signal into a pulse signal, utilizing means operating when activated by a predetermined pulse signal, said utilizing means being connected with said converting and decoding means for controlling wave signal transmission, single input gate controlling means coupled between said converting and decoding circuit means and said utilizing means, said single input gate controlling means comprising an input terminal coupled to said converting and decoding means, first and second discharge devices connected together so as to form a multivibrator, circuit means connecting said input terminal to said first discharge device and delaying any pulse impressed upon said terminal, output terminal means connecting said second discharge device to said utilizing means, and individual circuit means for prematurely triggering said second discharge device coupled between said input terminal and said second discharge device.

4. In the receiver as set forth in claim 3 wherein the discharge devices are solid state semiconductors.

5. In a communications system, a circuit for determining whether or not the proper code signal has been received, the combination of, means for providing a train of coded pulse signals, utilization means responsive to said coded pulse signals for performing a predetermined task, means for monitoring said coded pulse signals, said monitoring means comprising first and second discharge devices connected as a monostable multivibrator circuit, said multivibrator is in its stable operating state when in the absence of any coded pulse signals the second discharge device is in a condition of high conductance and the first discharge device is in a condition of relatively low conductance, circuit means connected between said coded pulse signal means and first discharge device for delaying said coded pulse signals for a predetermined time period, said multivibrator having a long natural time period as compared with the period of the delay, means for triggering said second discharge device connected between said coded pulse signal means and said second discharge means so that said second discharge means may be prematurely switched back to its high conducting state before the natural period of the multivibrator circuit has elapsed, and output means connected to said second discharge device providing a disabling gate so as to deactivate said utilization means whenever said first discharge device is in a state of high conductance.

6. In the communications system as set forth in claim 5 wherein a limiting circuit is coupled between said circuit means for delaying said coded pulse signal and said first discharge means thereby preventing jitter, attenuating and differentiating said delayed coded pulse signal.

7. In the communications system as set forth in claim 5 wherein said discharge devices are solid state semiconductors.

8. A single input gate controlling circuit comprising a multivibrator having one stable and one quasi-stable state, a source, a triggering means connected between said source and the stable side of said multivibrator for premature triggering, an output means connected to the stable side of said multivibrator, a delay means connected between said source and the quasi-stable side of said multivibrator for driving said multivibrator into the quasi-stable state.

9. A single input gate controlling circuit comprising a monostable multivibrator having a first and second state, said first state being stable, an input source connected to said monostable multivibrator, a means for prematurely triggering said first state connected between said source and the stable side of said monostable multivibrator, a means for delaying the triggering of said second state connected between said source and the other side of said monostable multivibrator, an output means connected to the stable side of said monostable multivibrator.

References Cited by the Examiner
UNITED STATES PATENTS

| 2,212,967 | 8/40 | White | 328—196 |
| 2,822,538 | 2/58 | Trevor. | |
| 3,018,384 | 1/62 | Zrubek | 307—88.5 |
| 3,019,350 | 1/62 | Gauthey | 307—88.5 |
| 3,035,248 | 5/62 | Grosse et al. | 307—88.5 |
| 3,040,189 | 6/62 | Cramer | 307—88.5 |

ARTHUR GAUSS, *Primary Examiner.*

JOHN W. HUCKERT, *Examiner.*